(12) United States Patent
Cescolini et al.

(10) Patent No.: US 9,171,254 B2
(45) Date of Patent: Oct. 27, 2015

(54) METHOD FOR ENCODING ONTOLOGY REASONING ON A PROGRAMMABLE LOGIC CONTROLLER

(71) Applicant: Siemens Aktiengesellschaft, Munich (DE)

(72) Inventors: Falco Riccardo Cescolini, Munich (DE); Stephan Grimm, Munich (DE); Michael Watzke, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 318 days.

(21) Appl. No.: 13/887,642

(22) Filed: May 6, 2013

(65) Prior Publication Data

US 2013/0297548 A1 Nov. 7, 2013

(30) Foreign Application Priority Data

May 4, 2012 (DE) .......................... 10 2012 207 437

(51) Int. Cl.
- *G06N 5/02* (2006.01)
- *G06F 17/30* (2006.01)
- *G06N 5/00* (2006.01)
- *G05B 19/05* (2006.01)

(52) U.S. Cl.
CPC ................ *G06N 5/02* (2013.01); *G05B 19/056* (2013.01); *G06F 17/30* (2013.01); *G06N 5/00* (2013.01)

(58) Field of Classification Search
None
See application file for complete search history.

(56) References Cited

U.S. PATENT DOCUMENTS

| 5,713,036 A * | 1/1998 | Kamiguchi et al. .......... 700/108 |
| 5,765,000 A * | 6/1998 | Mitchell et al. ............... 710/266 |
| 2007/0233287 A1 | 10/2007 | Sheshagiri et al. ............. 700/83 |
| 2010/0138017 A1 | 6/2010 | Vrba et al. ...................... 700/97 |

(Continued)

FOREIGN PATENT DOCUMENTS

| EP | 2447845 A1 | 5/2012 | ............. G06F 11/25 |
| WO | 2010/112264 A1 | 10/2010 | ........... G05B 19/408 |

OTHER PUBLICATIONS

"Description Logics as Ontology Languages for the Semantic Web", Franz Baader, Ian Horrocks, Ulrike Sattler, Mechanizing Mathematical Reasoning, Lecture Notes in Computer Science, vol. 2605, 2005, pp. 228-248.*

(Continued)

*Primary Examiner* — Kakali Chaki
*Assistant Examiner* — Mai T Tran
(74) *Attorney, Agent, or Firm* — Slayden Grubert Beard PLLC

(57) ABSTRACT

A method is disclosed for operating a programmable logic controller which executes program(s) based on cycles having a predetermined cycle time in a predefined memory. An automated reasoning method based on an ontology and a description logic is implemented in the programmable logic controller. To enable this, at least the concepts and roles of the ontology are encoded using index numbers and the axioms of the ontology are encoded using tuples of integral index numbers. The automated reasoning method is interrupted before the end of a cycle and subsequently resumed at the current status of program execution. This allows for the cyclic programming paradigm of a programmable logic controller. The method can be used for any types of programmable logic controller, e.g., controllers of devices belonging to an automation system or energy generation devices. In such scenarios the automated reasoning method may be used for diagnosing the corresponding devices.

16 Claims, 2 Drawing Sheets

(56) References Cited

U.S. PATENT DOCUMENTS

2010/0138698 A1* 6/2010 Angele et al. ................. 714/37
2011/0055240 A1* 3/2011 Li et al. ........................ 707/759
2012/0023054 A1  1/2012 Pirker ............................ 706/46

OTHER PUBLICATIONS

"Rule-Based OWL Reasoning for Specific Embedded Devices", Christian Seitz, ene Schonfelder, The Semantic Web, ISWC 2011, Lecture Notes in Computer Science, vol. 7032, 2011, pp. 237-252.*

"Embedded EL + Reasoning on Programmable Logic Controllers", Stephan Grimm, Michael Watzke, Thomas Hubauer, Falco Cescolini, The Semantic Web, ISWC 2012, Lecture Notes in Computer Science, vol. 7650, 2012, pp. 66-81.*

Baader, Franz et al., "Pushing the EL Envelope," Proceedings of the 19th International Joint Conference on Artificial Intelligence, URL: http://www.ijcai.org/papers/0372.pdf, 6 pages, 2005.

Baader, Franz et al., "Pushing the EL Envelope," LTCS-Report, Institute for Theoretical Computer Science, TU Dresden, 33 pages, 2005.

\* cited by examiner

METHOD FOR ENCODING ONTOLOGY REASONING ON A PROGRAMMABLE LOGIC CONTROLLER

CROSS-REFERENCE TO RELATED APPLICATIONS

This application claims priority to DE Patent Application No. 10 2012 207 437.6 filed May 4, 2012. The contents of which is incorporated herein by reference in its entirety.

TECHNICAL FIELD

The disclosure relates to a method for operating a programmable logic controller as well as to a corresponding programmable logic controller.

BACKGROUND

Programmable logic controllers (PLCs) are used mainly for the open- and closed-loop control of technical installations and for that purpose are programmed by means of control logic based on Boolean algebra. The knowledge relating to the mode of operation of the technical installation or component requiring to be controlled is assimilated in the process during the programming of the programmable logic controller through the medium of the expertise of the programming engineer and therefore is implicitly contained in the corresponding control statements.

Due to the limited working memory of programmable logic controllers as well as the cyclic program execution paradigm employed by such controllers there are currently no approaches which describe the use of such controllers for knowledge-based problem solving by means of what are termed reasoning methods. Reasoning methods serve in this case for automated computer-assisted inferencing using what is termed an ontology and a description logic.

SUMMARY

One embodiment provides a method for operating a programmable logic controller which executes one or more programs based on cycles having a predetermined cycle time in a predefined memory, wherein at least one executed program is an automated reasoning method based on an ontology and a description logic, wherein the ontology contains a plurality of data elements comprising at least concepts and roles as well as a plurality of axioms of predetermined axiom types, wherein an axiom represents an assertion in relation to one or more data elements of the ontology; wherein the data elements are encoded by means of integral index numbers and the axioms are encoded by means of tuples composed of integral index numbers, wherein a respective tuple comprises an integral index number encoding the axiom type of the axiom and the index number or index numbers which encodes or encode the data element or data elements that are contained in the assertion of the axiom; and wherein the automated reasoning method is interrupted before the end of a cycle and the current status of the program execution of the method is stored, the automated reasoning method being resumed in the next cycle based on the stored current status of the program execution.

In a further embodiment, the ontology is stored in a predetermined memory area of the predefined memory of the programmable logic controller, the predetermined memory area containing the tuples composed of integral index numbers.

In a further embodiment, respective separate index sets are used for at least the concepts and roles as well as for the axiom types.

In a further embodiment, the ontology is represented by means of the ontology language OWL2, and preferably OWL 2 EL, and/or the description logic is the EL+ logic or the EL++ logic.

In a further embodiment, the plurality of data elements comprise individuals and/or data type properties and/or concrete domain predicates as further data elements that are encoded by means of integral index numbers.

In a further embodiment, the automated reasoning method is a consequence-driven method and in particular the CEL algorithm.

In a further embodiment, axioms for such axiom types which can be inferred or with which it is possible to infer by means of the automated reasoning method are represented by a multidimensional array of bits which is associated with the respective axiom type, the dimensions of an array representing index numbers in accordance with the respective data elements contained in the assertion of the axiom corresponding to the respective axiom type, such that axioms are represented by the respective positions of corresponding bit values in the array, wherein it is encoded by means of the bit value whether the axiom was inferred by the automated reasoning method.

In a further embodiment, the ontology is a normalized ontology in which the axioms from the original ontology have been converted into axioms from a predefined number of axiom types.

In a further embodiment, only the automated reasoning method executes on the programmable logic controller or wherein one or more further programs execute on the programmable logic controller in addition to the automated reasoning method.

In a further embodiment, the programmable logic controller receives and processes measured variables from one or more technical components, current measured variables being incorporated into the ontology through generation of axioms from the current measured variables.

In a further embodiment, the automated reasoning method is used to perform a diagnosis of one or more technical components.

In a further embodiment, in the course of the diagnosis one or more output values are output which represent one or more malfunctions of the technical component(s), whereupon one or more actions are triggered by the programmable logic controller.

In a further embodiment, the programmable logic controller is provided for one or more technical components in the form of one or more devices of an automation system, in particular an automation system for automated manufacturing or an automation system for process automation.

In a further embodiment, the programmable logic controller is provided for one or more technical components in the form of one or more energy generation devices, in particular for one or more turbines.

Another embodiment provides a programmable logic controller which during operation executes one or more programs based on cycles having a predetermined cycle time in a predefined memory, wherein at least one executed program is an automated reasoning method based on an ontology and a description logic, the programmable logic controller being programmed for the purpose of performing a method, wherein the ontology contains a plurality of data elements comprising at least concepts and roles as well as plurality of axioms of predetermined axiom types, an axiom representing an assertion in relation to one or more data elements of the ontology; wherein the data elements are encoded by means of integral index numbers and the axioms are encoded by means of tuples composed of integral index numbers, a respective tuple comprising an integral index number encoding the axiom type of the axiom as well as the index number or index numbers which encode the corresponding data element or data elements that are contained in the assertion of the axiom; and wherein the automated reasoning method is interrupted before the end of a cycle and the current status of the program execution of the method is stored, the automated reasoning method being resumed in the next cycle based on the stored current status of the program execution.

In a further embodiment, the programmable logic controller is embodied for performing any of the methods disclosed above.

BRIEF DESCRIPTION OF THE DRAWINGS

Example embodiments are described in detail below with reference to the attached figures, in which.

DETAILED DESCRIPTION

Figure 1:
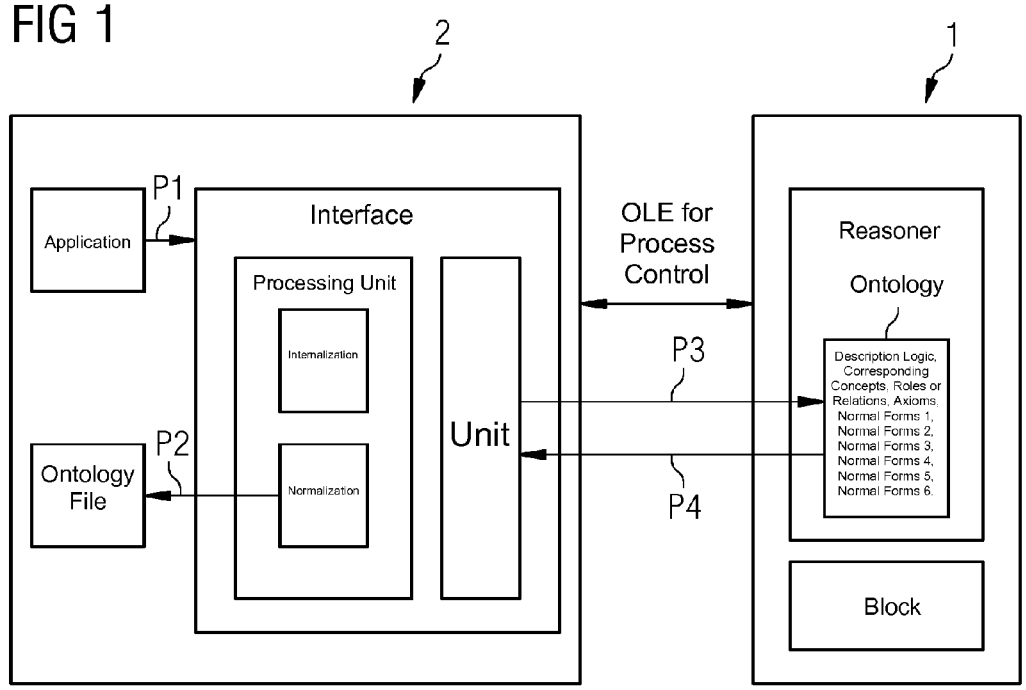
FIG. 1 is a schematic diagram illustrating the configuration of an example programmable logic controller according to one embodiment.

Some embodiments provide a method for operating a programmable logic controller which executes an automated computer-assisted reasoning method on the programmable logic controller.

The disclosed method serves for operating a programmable logic controller that executes one or more programs based on cycles having a predetermined cycle time in a predefined memory which is limited in size. According to some embodiments at least one executed program is an automated reasoning method based on an ontology and a description logic.

The ontology used in the disclosed method includes a plurality of data elements comprising at least concepts and roles as well as a plurality of axioms, an axiom representing a (true) statement or assertion in relation to one or more data elements of the ontology. In this case the terms that have just been cited, namely concepts, roles and axioms, are sufficiently well-known elements of an ontology.

In order now to execute the automated reasoning method in the limited memory of a programmable logic controller, the data elements (i.e. the symbolic names of the data elements) are in each case encoded by means of integral index numbers and the axioms are encoded by means of tuples composed of integral index numbers. A respective tuple in this case comprises an integral index number encoding the axiom type of the axiom as well as the index number or index numbers which encode the data element or data elements contained in the assertion of the axiom.

In order also to take account of the cyclic programming paradigm of a programmable logic controller in the automated reasoning method, the method is interrupted prior to the end of a cycle and the current status of the program execution of the method is stored, the automated reasoning method being resumed in the next cycle based on the stored current status of the program execution. The disclosed method can therefore be applied only to such programmable logic controllers that provide a suitable interrupt mechanism.

The disclosed method enables an ontology-based reasoning method to be implemented in a programmable logic controller for the first time. This is achieved in that the ontology is efficiently encoded by way of integral index numbers and furthermore the cyclic execution of programs is taken into account through corresponding interruption and resumption of the reasoning method.

In one embodiment the ontology is stored in a predetermined memory area of the predefined memory of the programmable logic controller, the predetermined memory area containing the tuples composed of integral index numbers. Efficient access to the ontology during the program execution is ensured by this means.

In a further embodiment respective separate index sets are used for at least the classes and roles and where appropriate also for other types of data elements as well as for the axiom types, which index sets preferably start with the integer zero and are numbered consecutively. The ontology is particularly efficiently encoded by this means.

In one embodiment the known description logic EL+ or EL++ is used as the basis of the ontology. The ontology is represented in particular in the likewise well-known ontology language OWL 2 and preferably OWL 2 EL (see in this regard the corresponding W3C recommendation at http://www.w3.org/TR/owl2-profiles/). By resorting to these known description logics it is easily possible to implement a knowledge-based model and a reasoning-based method in a programmable logic controller.

In another embodiment the plurality of data elements includes, in addition to the above-described concepts or roles, individuals and/or data type properties and/or concrete domain predicates as further data elements which are encoded by means of integral index numbers. Said further data elements are known per se and included in particular in the EL++ description logic.

In an embodiment the ontology used in the disclosed method is a normalized ontology in which the axioms from the original ontology are transformed into axioms from a given number of axiom types (also referred to as normal form axioms). Such normal form axioms are predefined by the description logic considered in each case. Since only a limited set of axiom types is used, the automated reasoning method can be realized in a particularly storage-efficient manner in the programmable logic controller.

In one variant of the disclosed method the automated reasoning method used is a consequence-driven method, and in particular the CEL algorithm, which is described inter alia in publication [1]. Consequence-driven reasoning methods are known and perform the reasoning in a rule-based manner using predetermined completion rules.

In one embodiment of the disclosed method reasoning results are represented by means of arrays made up of bits. In this case axioms for such axiom types which can be inferred or with which it is possible to infer by means of the automated reasoning method are represented by a multidimensional array of bits which is associated with the respective axiom type, the dimensions of an array representing index numbers in accordance with the respective data elements contained in the assertion of the axiom corresponding to the respective axiom type, such that axioms are represented by the respective positions of corresponding bit values in the array, wherein it is encoded by means of the bit value whether the axiom was inferred by the automated reasoning method. In a preferred variant of the embodiment just described, reasoning results of the automated reasoning method are represented for axioms of the type $C \sqsubseteq D$ or of the type $C \sqsubseteq \exists r.D$ by, respectively, a two- or three-dimensional array of bits associated with the respective axiom type in order to implement a variant of the CEL algorithm. The dimensions of an array in this case represent index numbers in accordance with the respective data elements (i.e. index numbers of the concept names and/or role names) that are present in an axiom of the respective corresponding axiom type, such that axioms are represented by the respective positions of corresponding bit values in the array, wherein it is encoded by means of the bit value whether the axiom was inferred by the automated reasoning method.

In a further embodiment only the automated reasoning method runs on the programmable logic controller. In certain cases it is, however, also possible for one or more further programs to be executed in the programmable logic controller in addition to said method. These programs are in particular the programs implemented per se in the programmable logic controller and normally provided for controlling a technical installation or component.

In another embodiment the programmable logic controller receives and processes measured variables of one or more technical components, current measured variables being incorporated in the ontology by generation of axioms from the current measured variables. In this way the current operating status of the technical component monitored by means of the programmable logic controller can be taken suitably into account in the knowledge-based inferencing method.

In another embodiment a diagnosis of one or more technical components is performed using the automated reasoning method. In this case the diagnosis outputs in particular one or more output values which represent one or more malfunctions (if present) of the technical component, whereupon one or more actions are triggered by the programmable logic controller. In the simplest case the programmable logic controller can pass on information concerning the malfunctions e.g. to a central control center or to a higher-ranking diagnostic unit.

Equally, the programmable logic controller can issue suitable control commands to the monitored technical component or components on its own initiative in order to rectify a malfunction.

The disclosed method can be deployed in a variety of technical fields. Preferably the method is used to operate a programmable logic controller for one or more technical components in the form of one or more devices of an automation system, in particular an automation system for automated manufacturing or an automation system for process automation, for example for the purpose of diagnosing such an automation system. The disclosed method for the programmable logic controller can equally be used by one or more energy-generating devices, in particular for diagnosing one or more turbines, such as e.g. gas turbines, wind turbines, steam turbines or the like. Potential applications in the corresponding technical fields are not limited to diagnostic applications, but rather the disclosed method can also be used where appropriate for special control tasks.

Other embodiments provide a programmable logic controller which during operation executes one or more programs based on cycles having a predetermined cycle time in a predefined memory, at least one executed program being an automated reasoning method based on an ontology and a description logic. The programmable logic controller is in this case programmed in such a way that the disclosed method or, as the case may be, one or more preferred variants of the disclosed method can be performed using the programmable logic controller.

FIG. 1 is a schematic diagram illustrating the implementation of a computer-assisted automated reasoning method (also referred to herein below as a reasoner) in a programmable logic controller (also referred to herein below as a PLC). The programmable logic controller, labeled with reference sign 1 in FIG. 1, is in this case provided for a technical component or possibly also a plurality of technical components and in the embodiment variant described here is responsible for diagnosing the component(s) based on knowledge-based problem solving with the aid of a reasoner RE. The programmable logic controller can monitor e.g. a corresponding device or multiple devices of an automation system in order to detect malfunctions of the system.

The controller 1 receives corresponding measured values from sensors, said values describing the status of the device monitored by the controller, and subjects this sensor data to a preprocessing stage. Said preprocessing takes place in the block SI of FIG. 1 and maps the sensor data to corresponding axioms of an ontology ON. These axioms are incorporated into the knowledge base or ontology ON, which is part of the reasoner RE. As well as current statuses of the device the ontology ON also takes into account (static) characteristics of the monitored device. This means that in the controller 1 there is stored an ontology ON which is configured for the device monitored by the controller. This ontology is implemented via a configuration unit 2 which is preferably a personal computer which communicates with the programmable logic controller 1 via the per se known OPC interface (indicated by the arrow OPC; OPC=OLE for Process Control). The configuration unit includes an interface IN for communicating with the PLC 1. In this arrangement a unit CO is provided which stores the ontology ON in the memory of the PLC (arrow P3) in the course of an OPC communication and on the other hand receives results of the reasoner RE (arrow P4). The interface IN is controlled by way of a suitable application AP running on the configuration unit (arrow P1).

The ontology ON is based on a corresponding description logic DL, the description logic EL+ being used in the embodiment variant described here, as will be explained in greater detail further below. The ontology includes corresponding concepts C, roles or relations r, and axioms $\alpha$. In the embodiment variant described here there are six types of axioms NF1, NF2, ..., NF6, which are also referred to as normal forms.

The configuration unit 2 additionally includes an ontology preprocessing unit PR which initially reads in an ontology file OF via a corresponding read command (arrow P2). In the embodiment variant described here the ontology file is based on the ontology language OWL 2 EL. The ontology file OF is suitably preprocessed in the unit PR so that it can be used on a programmable logic controller. Toward that end a normalization NO is first performed in which the axioms of the ontology are mapped to the limited set of axiom types NF1 to NF6, as will be explained in greater detail further below. In addition an internalization IT of said normalized ontology is performed in which the corresponding concepts and roles of the ontology are mapped to integral index numbers and the axioms are mapped to tuples of such integral index numbers. This step will also be explained in greater detail further below. In the course of the configuration of the PLC 1 a suitably prepared ontology is therefore obtained in the preprocessing step PR, which ontology is then stored by way of the communication unit CO on the programmable logic controller 1. In the embodiment variant described here the elements contained in the stored ontology characterize the corresponding device which is monitored by the programmable logic controller.

Before the disclosed compact representation of the ontology processed in the reasoner RE is dealt with, the general structure of the ontology and of the reasoner in the PLC 1 will be explained first. Ontologies are widely known from the field of information technology and are used to represent knowledge in a form that can be processed by computer, with corresponding reasoners being used to derive from said knowledge through inference new knowledge that is implicitly contained in the ontology. In the embodiment variant described here, an ontology based on the known ontology language OWL 2 EL is used. EL+ is used as the description logic.

The syntax and semantics of EL+ appear as follows:

| Syntax | Semantics |
|---|---|
| T | $\Delta^I$ |
| $C \sqcap D$ | $C^I \cap D^I$ |
| $\exists r, C$ | $\{x \in \Delta^I \mid \exists y \in C^I : (x,y) \in r^I\}$ |
| $C \sqsubseteq D$ | $C^I \subseteq D^I$ |
| $r_1 \circ \ldots \circ r_k \sqsubseteq r$ | $r_1^I \circ \ldots \circ r_k^I \subseteq r^I$ |

Here, C and D denote corresponding concepts, and r, $r_1, \ldots, r_k$ corresponding roles. Basic components for representing knowledge in EL+ are the concepts corresponding to a set $N_c$ of concept names. A concept name can designate e.g. a technical component, such as e.g. "gas turbine". Furthermore, the ontology contains so-called roles or relations corresponding to a set $N_r$ of role names, such as e.g. "hasComponent". Ontologies further comprise corresponding operators or constructors for describing relationships between concepts and roles. True assertions (i.e. axioms) for the domain described by means of the ontology are represented with the aid of said constructors. An EL+ ontology can comprise for example a set of concept inclusion axioms, for example in the form GasTurbine $\sqsubseteq$ Turbine. This axiom means that every gas turbine is a turbine. Read formally it implies that the set of all things that are a gas turbine is a subset of all things that are turbines. Role inclusion axioms may also be present, such as e.g. directlyControls $\circ$ hasSubComponent $\sqsubseteq$ controls, which corresponds to the assertion that control is propagated over the partonomy of a system. The symbol $\sqsubseteq$ represents a subset or subsumption relation.

In the EL+ ontology, concept descriptions and roles can furthermore be composed of simpler concepts and roles using the EL+-specific constructors $\sqcap$ (intersect) and $\exists$ (existence quantor). An example of a complex EL+ concept inclusion axiom is GasTurbine $\sqsubseteq$ $\exists$hasComponent.Combuster, which represents the assertion that every gas turbine includes a combustor as a component. Read formally it states that the set of all things that are a gas turbine is a subset of the set of all things that stand in a "hasComponent" relation to an element of the set combustor. The description logic EL+ is widely known and described in numerous publications. A feature of the description logic EL+ is that it does not include any "concept disjointness" by way of the so-called bottom concept $\bot$. Similarly, EL+ contains no nominals $\{o\}$, which enable information about specific instances of a concept to be expressed. These elements are not required in the embodiment described here.

The main objective of reasoning in the description logic EL+ is a classification which constructs a complete inferred subsumption hierarchy of the classes named in the ontology. In other words, all concept subsumptions $C \sqsubseteq D$ which are a logical consequence of the ontology are derived deductively, which can be formally expressed by $O \vdash C \sqsubseteq D$, where O designates the ontology and C and D designate the corresponding concept names.

Based on the EL+ ontology just described, in the programmable logic controller of FIG. 1 use is made of what is termed consequence-driven reasoning, in which knowledge is specified by way of completion rules which infer a corresponding consequence on the basis of one or more premises and a fulfilled condition. In the embodiment variant described here use is made of the consequence-driven CEL algorithm described inter alia in publication [1]. In this case the following completion rules are used:

$$(CR1) \frac{C \sqsubseteq C_1}{C \sqsubseteq D}[C_1 \sqsubseteq D_\in O]$$

$$(CR2) \frac{C \sqsubseteq C_1 \quad O \sqsubseteq C_2}{C \sqsubseteq D}[C_1 \sqcap C_2 \sqsubseteq D_\in O]$$

$$(CR3) \frac{C \sqsubseteq C_1}{C \sqsubseteq \exists r, D}[C_1 \sqsubseteq \exists r, D_\in O]$$

$$(CR4) \frac{C \sqsubseteq \exists r, C_1 \quad C_1 \sqsubseteq C_2}{C \sqsubseteq D}[\exists r, C_2 \sqsubseteq D_\in O]$$

$$(CR5) \frac{C \sqsubseteq \exists r, D}{C \sqsubseteq \exists s, D}[r \sqsubseteq s_\in O]$$

$$(CR6) \frac{C \sqsubseteq \exists r_1, C_1 \quad C_1 \sqsubseteq \exists r_2, D}{C \sqsubseteq \exists s, D}[r_1 \cdot r_2 \sqsubseteq s_\in O]$$

Here, C, $C_1$, $C_2$, D denote corresponding classes, and r, s, $r_1$, $r_2$ corresponding roles. The ontology is represented by the letter O, which is given in a special symbol notation in the above formulae. The individual completion rules CR1 to CR6 are to be understood in the sense that if the premise(s) above the horizontal line of the completion rule is(are) known as consequences of the ontology and if the axiom in the square brackets is contained in the ontology, then the conclusion below the horizontal line of the corresponding completion rule is also a valid consequence of the ontology.

Within the scope of the disclosed embodiment described here, the original ontology according to the ontology file OF is transformed into a semantically equivalent normalized ontology which only contains axioms in the normal forms (NF1) $C_1 \sqsubseteq D$, (NF2) $C_1 \sqcap C_2 \sqsubseteq D$, (NF3) $C_1 \sqsubseteq \exists r.D$, (NF4) $\exists r.C_2 \sqsubseteq D$, (NF5) $r \sqsubseteq s$, and (NF6) $r_1 \circ r_2 \sqsubseteq s$ for atomic concepts $C_1$, $C_2$ and D. In the above-cited completion rules there exists in this case precisely one completion rule (CRi) for each (NFi) axiom in the ontology. Starting from the trivial tautologies (assertions that are always true) $C \sqsubseteq T$ and $C \sqsubseteq C$ (valid for every concept name C in the normalized ontology), the consequence-driven CEL algorithm based on the above completion rules is then applied in order to derive additional subsumptions based on the explicitly included information of the normalized ontology as logical consequences. When the reasoning using the CEL algorithm has been terminated (i.e. when none of the above rules can be applied any longer), all valid subsumptions have been derived.

The above-described method can be represented by two mappings) $S:N_C^O \rightarrow P(N_C^O)$ and $R:N_C^O \rightarrow P(N_C^O \times N_C^O)$ which represent the derived subsumptions. $N_C^O$ and $N_C^O$ denote the set of concepts and roles, respectively, contained in the ontology, and P represents the power set. It is taken into account here that the premises and conclusions of the completion rules (CR1) to (CR6) comprise only two types of axioms, namely $C \sqsubseteq D$ and $C \sqsubseteq \exists r.D$. All axioms of these types are represented by the above mappings S and R as follows: $C \sqsubseteq D$ corresponds to the mapping entry $D \in S(C)$ and $C \sqsubseteq \exists r.D$ represents the entry $\{C,D\} \in R(r)$. Said mappings are initialized by $S(C)=\{C,T\}$ for each concept name C and by $R(r)=\emptyset$ for each role name r in the normalized ontology. In this case the checking of the premises in the above completion rules corresponds to a lookup in the mappings S and R. Analogously, the conclusions correspond to the addition of elements to the corresponding mapping. In this case the classification result of the ontology can be easily derived from the mappings S and R following completion of the reasoning. For a more precise description of the CEL algorithm reference is made to publications [1] and [2].

The problem that exists when the above-described reasoning is used in a programmable logic controller is that only a limited and purely static working memory is available in such a controller. Furthermore, programmable logic controllers generally have no built-in functions in the firmware for processing character strings in order for example to be able to operate efficiently with concept and role names of an ontology. In order to solve this problem, according to FIG. 1 an internalization IN is performed in which the concept names and role names of the EL+ ontology are compactly represented by integral index numbers which are obtained by simple enumeration of the elements in the set $N_C^O$ and $N_C^O$ respectively. The index numbers can be assigned for example in the lexicographic order of the string names of the elements.

The index numbers are used in an array-based, compact ontology representation on the programmable logic controller. The corresponding axioms (NFi) of the normalized ontology require at most three class names or role names as parameters. Accordingly, in the embodiment variant described here the normalized axioms α are represented as a four-tuple $$\alpha = (T, p_1, p_2, p_3)$$

where T represents the axiom type of the corresponding normal forms NFi (i=1, . . . , 6) and $p_1$ represents the integral index numbers for the concept names or role names used in the respective axiom type.

Even if different positions in the above axiom tuple can be encoded by means of different bit lengths as a function of the number of the class or role, in the embodiment variant described here a representation has been chosen in which a predetermined storage space of two bytes for each integral index is used per position of an axiom, so that an encoded axiom has a total length of 8 bytes. Encoding using such a fixed bit length enables efficient memory access. With the encoding of the axioms just described, the normalized ontology is therefore represented on the programmable logic controller by means of a fixed-length array whose size in number of bytes corresponds to the number of axioms of the ontology multiplied by 8 bytes.

The classification result (reasoning result, subsumption hierarchy) derived in the course of the CEL reasoning, which is stored in the mappings S and R, is represented in the embodiment variant described here by the two- and three-dimensional fixed-length bit arrays S[i][j] and R[i][j][k], where j represent the index numbers of the concept names and k represents the index numbers of the role names. It is indicated here by way of a bit value at the position in the array addressed by the respective indices whether the axiom has been derived as a result of the reasoning or not. A bit value of 1 can stand in this case for an inferred axiom and a bit value of 0 for a non-inferred axiom. In other words, D∈S(C), for example, always applies precisely when S[i] [j]=1, where i is the integer value for the concept name C and j is the integer value for the concept name D. Analogously, {C,D}∈R(r), for example, always applies precisely when R[i] [j] [k]=1, where i is the integer value for the concept name C, j is the integer value for the concept name D, and r is the integer value for the role name r.

If it is assumed that in certain instances all axioms of the types A ⊑ B and A ⊑ ∃r.B are derived, the following upper limits are obtained in number of bits for the length of the arrays:

$$l_S = (\#N_C^O)^2, l_R = (\#N_C^O)^2 \cdot \#N_C^O.$$

Thus, the total amount of memory space required in order to represent the reasoning results in S and R is given by $(l_S + l_R)/8$ in bytes.

In addition to the limited storage capacity a further problem in implementing a reasoner in a PLC consists in the fact that a PLC is based on a cyclic processing paradigm, according to which programs in the memory of the PLC are executed in fixed-length cycle times. Reasoning algorithms, by contrast, operate with varying processing time which is dependent on the number of axioms contained in an ontology. This problem is illustrated again with the aid of FIG. 2. This figure shows a time diagram, the fixed sequential cycle times $t_{CYC}$ of a PLC being represented along line L1. Line L2 shows by way of example a processing time $t_{CEL}$ for CEL reasoning. This processing time is much longer than a cycle and extends for example over more than three cycles. Corresponding rules of the reasoner are executed within the processing time $t_{CEL}$, the process times for executed rules being designated by way of example by $t_{R1}$ and $t_{R3}$ and $t_{R5}$. The rules correspond in this case to equivalent completion rules of the CEL algorithm.

Figure 2:
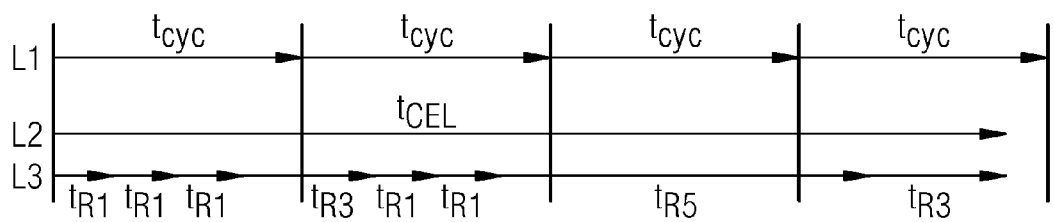
FIG. 2 is a time diagram illustrating the problem of executing a reasoning method within the context of the cyclic programming paradigm of a programmable logic controller.

As can be seen from FIG. 2, corresponding end times for the cycles occur during the execution of the reasoner's rules. Without further measures the programmable logic controller would therefore assume an error state. This problem is solved according to the disclosure in that a time-out mechanism is implemented which artificially interrupts the program execution of the reasoner. This is achieved in that during the processing of the rules a check is carried out in the reasoner to determine whether a timer that signals an imminent end of cycle has timed out. It must be specified in a suitable manner how long before the end of the cycle the timer will time out. If the timer has timed out, the status of the currently processed rule is stored. This means that no executed program is present at the time of the termination of a cycle, so no error state occurs. In this case the stored status includes the index variables serving the interaction across the structures S and R in order to check the applicability of a rule, as well as the type of the rule just processed. At the start of the new cycle rule processing is resumed, starting from the stored status. The cycle times are therefore utilized in an efficient manner for calculations by the reasoner. The overhead due to the storing of the statuses of the processed rules is negligibly low, so almost the entire time of the cycles can be used for calculations by the reasoner.

The reasoning implemented in the programmable logic controller can be used for a variety of purposes. In a preferred variant the reasoning is used for diagnosing corresponding devices that are monitored by the programmable logic controller. A diagnosis of such type is described by way of example below in relation to a gas turbine monitored by way of a PLC.

The example is based on a scenario in which a central control point is responsible for an energy generation plant comprising a corresponding plurality of gas turbines. Each plant typically comprises one to three gas turbines equipped with several hundred sensors which are provided on various components of the turbine. All the sensors typically provide measured values at a rate between 0.1 and 1.0 Hz. In a corresponding programmable logic controller of each gas turbine a reasoner is now implemented for diagnosing operating states. Toward that end the reasoner evaluates the measured values of the sensors and can establish causes for abnormal operating states. Said causes are then passed on to the central control point.

The diagnostic knowledge about the gas turbine is represented by axioms of the EL+ description logic. For example, an axiom can contain the assertion "vibrations of the turbine blades and temperature fluctuations in the combustion chamber of the turbine indicate a failure of the combustion flame". This assertion can be represented by the following axiom in the ontology:

System ⊓ ∃hasComponent.(Fan ⊓ ∃hasSymptom.
Vibrations) ⊓ ∃hasComponent.(CombChamber
⊓ ∃hasSymptom.TempFluctuations) ⊑ ∃has
Diagnosis.CanFlameFailure Here, "System", "Vibrations", "CombChamber", "TempFluctuations", "CanFlameFailure" designate corresponding ontology concepts. System stands for a generic technical system, Fan for the turbine blade, Vibrations for vibrations of the turbine blade, CombChamber for the combustion chamber of the turbine, TempFluctuations for temperature fluctuations and CanFlameFailure for a failure of the combustion flame. Roles are represented by the terms "hasComponent", "hasSymptom", and "hasDiagnostics".

The model of the ontology representing the turbine in this case comprises the axioms Turbine ⊑ ∃hasComponent.Fan and Turbine ⊑ ∃hasComponent.CombChamber, which describe components of the turbine. This static knowledge about the turbine is supplemented at runtime by additional axioms based on corresponding sensor measurements which are evaluated by the programmable logic controller. If e.g. a vibration sensor detects vibrations exceeding a predetermined threshold at the hub of the turbine blade, the corresponding axiom Fan ⊑ ∃hasSymptom.Vibrations is added. Analogously, if temperature fluctuations in the combustion chamber are detected by corresponding sensors, the corresponding axiom CombChamber ⊑ ∃hasSymptom.TempFluctuations is added. The axiom Turbine ⊑ ∃hasDiagnosis.CanFlameFailure is then derived by way of the reasoner from the resulting ontology, indicating that a failure of the combustion flame is present. This information can then be passed on to the central control point which monitors the operation of a corresponding energy generation facility and initiates appropriate countermeasures.

As is evident from the above example, a corresponding diagnostic functionality can therefore be realized in a programmable logic controller directly on the monitored device, said functionality being implemented by way of a knowledge-based method by means of a reasoner. According to the disclosed method, in order to achieve a reasoner implementation in a PLC, a representation of the axioms of the ontology by way of whole numbers has been chosen in this case. Furthermore, the program execution of the reasoner is always temporarily interrupted when corresponding ends of cycle of the controller are reached.

The disclosed method has been evaluated by the inventors for various test/benchmark ontologies within the framework of a simulation of a programmable logic controller. It was successfully demonstrated that the method does in fact support the program execution of a reasoner in an acceptable runtime on a programmable logic controller.

Figure 3:
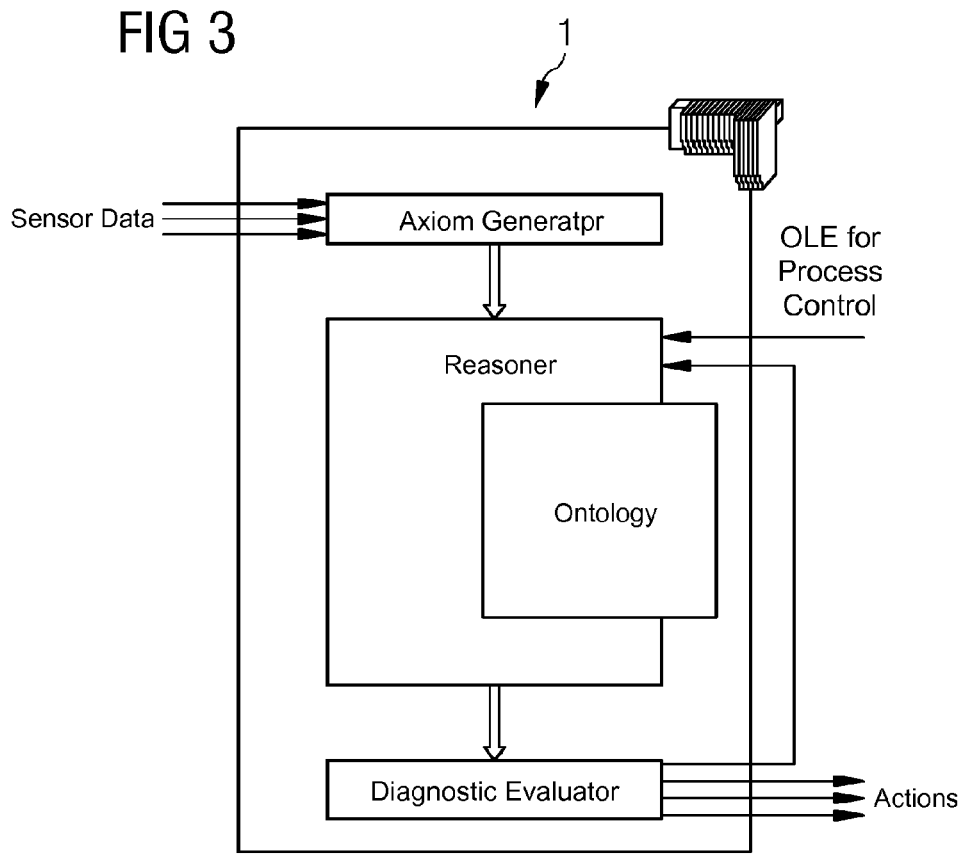
FIG. 3 shows a detail of the programmable logic controller from FIG. 1.

FIG. 3 shows a detail view of the programmable logic controller 1 of FIG. 1 which illustrates the functionalities of the controller that may be important or even essential in certain embodiments. At runtime, the controller 1 receives corresponding sensor data SD as input variables. Corresponding axioms are generated from said data in an axiom generator AG, which in FIG. 1 is integrated in the sensor preprocessing block SI, and said axioms are then supplied to the reasoner RE with the knowledge base contained therein. The static data of the knowledge base is in this case received from the configuration unit 2 via the interface OPC. The reasoning is then performed on the basis of the knowledge base ON, which represents the monitored technical component as well as current sensor data of the technical component. The inferred result in the form of new axioms is then supplied to a diagnostic evaluator DI (not shown separately in FIG. 1). Based on the inferred diagnostic assertions, such as e.g. the assertion described hereinabove, namely that the turbine flame has failed, the diagnostic evaluator triggers one or more corresponding actions A. The diagnostic result can also be processed further in the reasoner RE.

A detailed description of the mode of operation of the axiom generator AG and of the diagnostic evaluator DI follows.

The axiom generator AG is loaded with data contained as annotations in the ontology and receives as input the current sensor values, which are thereupon converted into EL+ axioms or EL++ axioms (see embodiment variant described further below) and added to the axioms of the ontology ON. The axiom generator AG essentially consists of two functions. The first is invoked once in each execution cycle of the PLC, retrieves the current sensor values and stores same in a data structure provided therefor. Arrays can be used to monitor a longer period of time and so allow assertions over a time characteristic curve. The second function is invoked in the initialization step of the reasoner RE. It has a set of parameterizable subfunctions and a data structure containing configuration data. This configuration data is determined from the annotations of the ontology. It comprises data records having the following content: subfunction to be invoked, memory area to be evaluated, and a mapping of possible result values onto axioms that are to be added to the ontology, e.g. ($f_2$, 0x18, true→DistanceSensor ⊑ ∃shows.Movement). These axioms are then added to the other axioms of the reasoner in accordance with the sensor values.

Following termination of the reasoning process, the diagnostic evaluator DI checks certain axioms contained in the arrays S or R and thereupon generates a prebuilt action. Toward that end the diagnostic evaluator, like the axiom generator AG, has a set of prebuilt functions which are invoked when a specific axiom, e.g. System ⊑ DefectSystem, has been derived. Such a prebuilt function can for instance execute an intervention in the actuator system or send a message to a central point or restart the reasoning process. The function of the diagnostic evaluator DI can also have been configured by way of annotations contained in the ontology. Such an annotation in the ontology would contain an axiom as condition, a function as action, and possibly parameters for the function, e.g.: (System ⊑ DefectSystem, sendMessageSystemDefect, recipient=PLC13). These particular annotations establish the link between the basic functionalities provided by the axiom generator AG and the diagnostic evaluator DI, the sensor values of the hardware and the symbolism of the ontology. In this way a large part of the knowledge in relation to the hardware and the evaluation operations within the ontology can be described. This increases the degree of application independence of the functionalities implemented on the PLC.

Below there follows a description of a further embodiment which implements the description logic EL++ instead of the description logic EL+. As is known in the art, EL++ comprises additional data elements over and above EL+, such as the bottom concept, individuals, nominals, concrete domains, concept and role assertions, as well as domain and range restrictions (set limits on the definition and value range of the object properties). The syntax and semantics of EL++ are shown in the following table (see also document [2]):

| Name | Syntax | Semantics |
|---|---|---|
| top | $\top$ | $\Delta^I$ |
| bottom | $\bot$ | $\emptyset$ |
| nominal | $\{a\}$ | $\{a^I\}$ |
| conjunction | $C \sqcap D$ | $C^I \cap D^I$ |
| existential restriction | $\exists r, C$ | $\{x \in \Delta^I \mid \exists y \in \Delta^I : (x,y) \in r^I \wedge y \in C^I\}$ |
| concrete domain | $p(f_1, \ldots, f_k)$ for $p \in P^D_j$ | $\{x \in \Delta^I \mid \exists y_1, \ldots, y_k \in \Delta^D_j : f_i^I(x) = y_i \text{ for } 1 \leq i \leq k \wedge (y_1, \ldots, y_k) \in p^D_j\}$ |
| GCI | $C \sqsubseteq D$ | $C^I \subseteq D^I$ |
| RI | $r_1 \circ \ldots \circ r_k \sqsubseteq r$ | $r_1^I \circ \ldots \circ r_k^I \subseteq r^I$ |
| domain restriction | $\text{dom}(r) \sqsubseteq C$ | $r^I \subseteq C^I \times \Delta^I$ |
| range restriction | $\text{ran}(r) \sqsubseteq C$ | $r^I \subseteq \Delta^I \times C^I$ |
| concept assertion | $C(a)$ | $a^I \in C^I$ |
| role assertion | $r(a,b)$ | $(a^I, b^I) \in r^I$ |

In this embodiment variant three new elements are mapped onto index numbers in the form of integer values in the internalization step IT of FIG. 1. These elements are:
1. Individuals—concrete instances of a concept.
2. Datatype properties (also called feature names)—these link individuals with raw data values such as integers, doubles, strings, etc. These data values can be processed in a concrete domain (also abbreviated to CD in the following).
3. Concrete domain predicates—a CD is a calculation domain lying outside of a description logic, such as e.g. predicate logic or arithmetic on whole or real numbers. Predicates contain assertions in relation to the CD and link the description logic thereto. The internalization step IT generates these predicates for the CD from specific axioms.

The calculation and complexity of a CD can be arbitrarily high. Since more complex logics could accordingly be described by way of the CD than are allowed in EL++, the CD must comply with the p-admissibility condition (p-admissibility constraint, see document [2]), which is restrictive to the extent that the CD does not leave the scope of EL++. The p-admissibility constraint states that a CD can be calculated in polynomial time and no disjunctions can be derived from the CD, which otherwise would implicitly extend EL++ and therefore must be avoided.

Since a CD can be relatively complex in its implementation and only limited resources are available on the programmable logic controller, an integer-interval domain is used in the embodiment variant. This observes the p-admissibility constraint, is highly efficient in terms of calculation performance and memory space requirements and particularly useful in the case of a diagnostic application in which the reasoner of the PLC is used to diagnose a technical component. These properties make the integer interval CD particularly suitable for implementation on the PLC.

The data property assertion is the only new axiom that is added to the above-described normal forms NF1 to NF6 and is not converted to one of the other six normal forms in the normalization NO of FIG. 1. It contains the statement concerning the linking of individuals by way of a datatype property to raw data values. An example of this would be the axiom $\{\text{Engine3}\} \sqsubseteq \exists\text{hasTemperature}.93$, which expresses in colloquial terms that the temperature of the engine 3 is 93° Celsius.

Three additional data structures are used in order to implement the described CD and the support for individuals. These structures are called DMAP, PredMap and PathMap.

DMAP$_{i,j}$ is a two-dimensional integer matrix with index $i \in N_{Individuals}$ (set of internalized identifiers for individuals) and $j \in N_{FeatureNames}$ (set of internalized identifiers for feature names). The matrix contains the values of the data property assertions, i.e. 16-bit integers. The value −32768 (hexadecimal 0x8000) is highlighted and means that no assertion is present in relation to this feature name.

The PredMap$_i$ data structure contains all the data of the CD predicates generated in the internalization IT. PredMap is an array and the index i is the internalized identifier of the predicate. An entry in this array is a tuple of the form (relation type, integer value, feature name) and comprises three integer values. The relation types realized for the integer interval domain are operators "<", "≤", "=", "≥" and ">". Integer value is a 16-bit integer value in the range from −32767 to +32767. The value −32768 (hexadecimal 0x8000) is highlighted with the meaning "value not present". The feature name is the identifier, i.e. the internalized integer value, of the datatype property belonging to the predicate. An example of such a predicate would be ≥18(hasAge), which would encompass all individuals over the age of 18, i.e. have a hasAge data property assertion with a value greater than or equal to 18.

The PathMap$_{i,j}$ data structure has the same structure as S. The semantics are whether there is a path between two concepts by way of an arbitrary concatenation of object property relations. As in the case of S, i and j stand for the respective concept. This data structure serves for performance optimization.

In addition to these data structures, the completion rules of the CEL algorithm have been extended in this embodiment variant for EL++ in accordance with document [2].

REFERENCES

[1] F. Baader, S. Brandt, and C. Lutz. Pushing the EL envelope. In Proc. of the 19th Int. Joint Conf. on Artificial Intelligence (IJCAI 2005), pages 364-369, 2005
[2] Franz Baader, Sebastian Brandt, Carsten Lutz. Pushing the EL envelope. LTCS Report, LTCS-05-01, Institute for Theoretical Computer Science, TU Dresden, 2005

What is claimed is:

1. A method for operating a programmable logic controller which executes one or more programs based on cycles having a predetermined cycle time in a predefined memory, wherein at least one executed program is an automated reasoning method based on an ontology and a description logic, wherein the ontology contains a plurality of data elements comprising at least concepts and roles as well as a plurality of axioms of predetermined axiom types, wherein an axiom represents an assertion in relation to one or more data elements of the ontology, the method comprising:
encoding the data elements using integral index numbers;
encoding the axioms using tuples of integral index numbers, wherein a respective tuple comprises an integral index number encoding the axiom type of the axiom and the at least one index number that encode the one or more data elements contained in the assertion of the axiom;

interrupting the automated reasoning method before an end of a cycle and storing the current status of the program execution of the method; and resuming the automated reasoning method in a next cycle based on the stored current status of the program execution.

2. The method of claim 1, comprising storing the ontology in a predetermined memory area of the predefined memory of the programmable logic controller, the predetermined memory area containing the tuples composed of integral index numbers.

3. The method of claim 1, wherein respective separate index sets are used for at least the concepts and roles as well as for the axiom types.

4. The method of claim 1, wherein the ontology is represented by the ontology language OWL2.

5. The method of claim 1, wherein the plurality of data elements comprise at least one of individuals, datatype properties, and concrete domain predicates as further data elements that are encoded by means of integral index numbers.

6. The method of claim 1, wherein the automated reasoning method is the CEL consequence-driven algorithm.

7. The method of claim 1, wherein:
axioms for such axiom types which can be inferred by the automated reasoning method are represented by a multidimensional array of bits associated with the respective axiom type; and
the dimensions of an array representing index numbers according to the respective data elements contained in the assertion of the axiom correspond to the respective axiom type, such that axioms are represented by the respective positions of corresponding bit values in the array, wherein the bit value indicates whether the axiom was inferred by the automated reasoning method.

8. The method of claim 1, wherein the ontology is a normalized ontology in which the axioms from the original ontology have been converted into axioms from a predefined number of axiom types.

9. The method of claim 1, wherein only the automated reasoning method executes on the programmable logic controller or wherein one or more further programs execute on the programmable logic controller in addition to the automated reasoning method.

10. The method of claim 1, wherein the programmable logic controller receives and processes measured variables from one or more technical components, wherein current measured variables are incorporated into the ontology through generation of axioms from the current measured variables.

11. The method of claim 1, comprising using the automated reasoning method to perform a diagnosis of one or more technical components.

12. The method of claim 11, wherein during the diagnosis one or more output values are output which represent one or more malfunctions of the one or more technical component, whereupon one or more actions are triggered by the programmable logic controller.

13. The method of claim 1, wherein the programmable logic controller is provided for one or more technical components in the form of one or more devices of an automation system for automated manufacturing or an automation system for process automation.

14. The method of claim 1, wherein the programmable logic controller is provided for one or more technical components in the form of one or more energy generating turbines.

15. A programmable logic controller which during operation executes one or more programs based on cycles having a predetermined cycle time in a predefined memory, wherein at least one executed program is an automated reasoning method based on an ontology and a description logic, wherein the ontology contains a plurality of data elements comprising at least concepts and roles as well as plurality of axioms of predetermined axiom types, an axiom representing an assertion in relation to one or more data elements of the ontology, the programmable logic controller being programmed to:
encode the data elements using integral index numbers;
encode the axioms using tuples composed of integral index numbers, a respective tuple comprising an integral index number encoding the axiom type of the axiom as well as at least one index number that encodes the corresponding one or more data elements contained in the assertion of the axiom;
interrupt the automated reasoning method before an end of a cycle and storing the current status of the program execution of the method; and
resume the automated reasoning method in a next cycle based on the stored current status of the program execution.

16. The method of claim 1, wherein the description logic is EL+ logic or EL++ logic.

* * * * *